(12) United States Patent
Seiden et al.

(10) Patent No.: US 12,380,091 B2
(45) Date of Patent: Aug. 5, 2025

(54) ASSIGNING SEQUENCE NUMBERS IN EDITABLE TABLES

(71) Applicant: SIGMA COMPUTING, INC., San Francisco, CA (US)

(72) Inventors: Max H. Seiden, San Francisco, CA (US); Rodolphe Gagneron, San Diego, CA (US); Gregory G. Owen, San Mateo, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 226 days.

(21) Appl. No.: 17/559,597

(22) Filed: Dec. 22, 2021

(65) Prior Publication Data

US 2023/0146077 A1 May 11, 2023

Related U.S. Application Data

(60) Provisional application No. 63/278,356, filed on Nov. 11, 2021.

(51) Int. Cl.
| | |
|---|---|
| *G06F 16/23* | (2019.01) |
| *G06F 16/21* | (2019.01) |
| *G06F 16/22* | (2019.01) |
| *G06F 16/2458* | (2019.01) |
| *G06F 16/25* | (2019.01) |
| *G06F 16/28* | (2019.01) |
| *G06F 21/62* | (2013.01) |

(52) U.S. Cl.
CPC ........ *G06F 16/2379* (2019.01); *G06F 16/219* (2019.01); *G06F 16/2282* (2019.01); *G06F 16/2474* (2019.01); *G06F 16/254* (2019.01); *G06F 16/283* (2019.01); *G06F 21/6227* (2013.01); *G06F 21/6245* (2013.01)

(58) Field of Classification Search
CPC ............... G06F 16/219; G06F 16/2282; G06F 16/2379; G06F 16/2474; G06F 16/254
See application file for complete search history.

(56) References Cited

U.S. PATENT DOCUMENTS

| | | | |
|---|---|---|---|
| 6,480,857 B1 * | 11/2002 | Chandler | G06F 16/284 |
| | | | 707/999.102 |
| 7,509,332 B1 * | 3/2009 | Milby | G06F 16/284 |
| | | | 707/999.102 |

(Continued)

FOREIGN PATENT DOCUMENTS

WO 2023086504 A1 5/2023

OTHER PUBLICATIONS

International Search Report and Written Opinion, PCT/US2022/049594, Feb. 17, 2023, 14 pages.

*Primary Examiner* — Richard L Bowen

(57) ABSTRACT

Assigning sequence numbers in editable tables including receiving, by a table manager via a client computing system, an instruction to create a new row on an editable table in a cloud-based data warehouse, wherein the instruction comprises a column value and a row identifier of an adjacent row; calculating, by the table manager, a sequence value for a sequence column of the new row based on the row identifier of the adjacent row; and generating, by the table manager, a database statement instructing the cloud-based data warehouse to add the new row, including the column value and sequence value, to the editable table on the cloud-based data warehouse.

20 Claims, 8 Drawing Sheets

(56) References Cited

U.S. PATENT DOCUMENTS

| | | |
|---|---|---|
| 7,949,633 B1 | 5/2011 | Shaver et al. |
| 8,006,174 B2 | 8/2011 | Aureglia et al. |
| 8,161,081 B2 | 4/2012 | Kaufman et al. |
| 8,375,011 B2 | 2/2013 | Fox et al. |
| 8,510,266 B1 | 8/2013 | Ho et al. |
| 8,676,772 B2 | 3/2014 | Gislason |
| 9,330,149 B2 | 5/2016 | Angrish et al. |
| 9,690,764 B1 | 6/2017 | Batni |
| 10,025,801 B2 | 7/2018 | Kaufman et al. |
| 10,140,352 B2 | 11/2018 | Hariharan et al. |
| 10,599,650 B2 | 3/2020 | Baeuerle et al. |
| 10,621,203 B2 | 4/2020 | Hunt et al. |
| 10,713,178 B2 | 7/2020 | Yen et al. |
| 10,885,051 B1 | 1/2021 | Peters et al. |
| 10,929,384 B2 | 2/2021 | Karunanithi et al. |
| 10,956,447 B2 | 3/2021 | Arnold et al. |
| 10,956,665 B1 | 3/2021 | Greenbaum et al. |
| 10,977,220 B2 | 4/2021 | Kaufman et al. |
| 10,990,571 B1 | 4/2021 | Zhang et al. |
| 11,100,101 B2 | 8/2021 | Zhao et al. |
| 11,137,987 B2 | 10/2021 | Namarvar et al. |
| 11,163,791 B2 | 11/2021 | Patel et al. |
| 11,216,422 B2 | 1/2022 | Cosic |
| 11,354,493 B2 | 6/2022 | Von Tish et al. |
| 11,443,110 B2 | 9/2022 | Davis et al. |
| 11,514,186 B2 | 11/2022 | Gandhi et al. |
| 11,636,408 B2 | 4/2023 | Sit et al. |
| 11,693,549 B2 | 7/2023 | Stojanovic et al. |
| 11,709,809 B1 | 7/2023 | Li et al. |
| 2003/0177481 A1 | 9/2003 | Amaru et al. |
| 2003/0217033 A1 | 11/2003 | Sandler et al. |
| 2004/0088334 A1 | 5/2004 | Klein |
| 2004/0103365 A1 | 5/2004 | Cox |
| 2005/0097187 A1* | 5/2005 | Thompson ............ G06F 16/252 709/219 |
| 2007/0033518 A1* | 2/2007 | Kenna .................. G06F 40/177 715/815 |
| 2007/0043706 A1 | 2/2007 | Burke et al. |
| 2008/0016041 A1 | 1/2008 | Frost et al. |
| 2009/0276692 A1* | 11/2009 | Rosner ................ G06F 16/2456 715/227 |
| 2010/0100558 A1 | 4/2010 | Bakalash et al. |
| 2010/0211862 A1 | 8/2010 | Parish et al. |
| 2010/0262647 A1 | 10/2010 | Malek et al. |
| 2010/0281372 A1 | 11/2010 | Lyons et al. |
| 2012/0311474 A1 | 12/2012 | McPherson et al. |
| 2014/0229424 A1 | 8/2014 | Gislason |
| 2015/0120687 A1 | 4/2015 | Bhattacharjee et al. |
| 2016/0162461 A1 | 6/2016 | Simon et al. |
| 2016/0321232 A1 | 11/2016 | Tan et al. |
| 2016/0321233 A1 | 11/2016 | He et al. |
| 2016/0378737 A1 | 12/2016 | Keslin et al. |
| 2017/0277743 A1* | 9/2017 | Jain .................... G06F 16/1873 |
| 2017/0286454 A1 | 10/2017 | Saeki et al. |
| 2018/0082289 A1 | 3/2018 | Johnson et al. |
| 2018/0096043 A1 | 4/2018 | Ledbetter et al. |
| 2018/0351781 A1 | 12/2018 | Movsisyan et al. |
| 2019/0095173 A1 | 3/2019 | Kaufman et al. |
| 2019/0095413 A1 | 3/2019 | Davis et al. |
| 2019/0206231 A1 | 7/2019 | Armstrong et al. |
| 2019/0294688 A1 | 9/2019 | Mohan |
| 2019/0392063 A1 | 12/2019 | Tosukhowong et al. |
| 2020/0034365 A1 | 1/2020 | Martin et al. |
| 2020/0150938 A1 | 5/2020 | Stachura |
| 2021/0081364 A1 | 3/2021 | Jiang et al. |
| 2021/0081605 A1* | 3/2021 | Smith ................... G06F 40/197 |
| 2021/0149858 A1 | 5/2021 | Xia et al. |
| 2021/0192601 A1 | 6/2021 | Dandy et al. |
| 2021/0223947 A1 | 7/2021 | Stojanovic et al. |
| 2022/0043779 A1 | 2/2022 | Maddila et al. |
| 2023/0143272 A1 | 5/2023 | Seiden et al. |
| 2023/0145697 A1 | 5/2023 | Seiden et al. |
| 2023/0147197 A1 | 5/2023 | Seiden et al. |
| 2023/0147424 A1 | 5/2023 | Seiden et al. |
| 2023/0195744 A1 | 6/2023 | Owen et al. |

* cited by examiner ized for graphic output to display devices such as display screens or computer monitors.

ASSIGNING SEQUENCE NUMBERS IN EDITABLE TABLES

CROSS-REFERENCE TO RELATED APPLICATIONS

This application is a non-provisional application for patent entitled to a filing date and claiming the benefit of earlier-filed U.S. Provisional Patent Application Ser. No. 63/278,356, filed Nov. 11, 2021, the contents of which are incorporated herein by reference in their entirety.

BACKGROUND

Field of the Invention

The field of the invention is data processing, or, more specifically, methods, apparatus, and products for assigning sequence numbers in editable tables.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for assigning sequence numbers in editable tables including receiving, by a table manager via a client computing system, an instruction to create a new row on an editable table in a cloud-based data warehouse, wherein the instruction comprises a column value and a row identifier of an adjacent row; calculating, by the table manager, a sequence value for a sequence column of the new row based on the row identifier of the adjacent row; and generating, by the table manager, a database statement instructing the cloud-based data warehouse to add the new row, including the column value and sequence value, to the editable table on the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
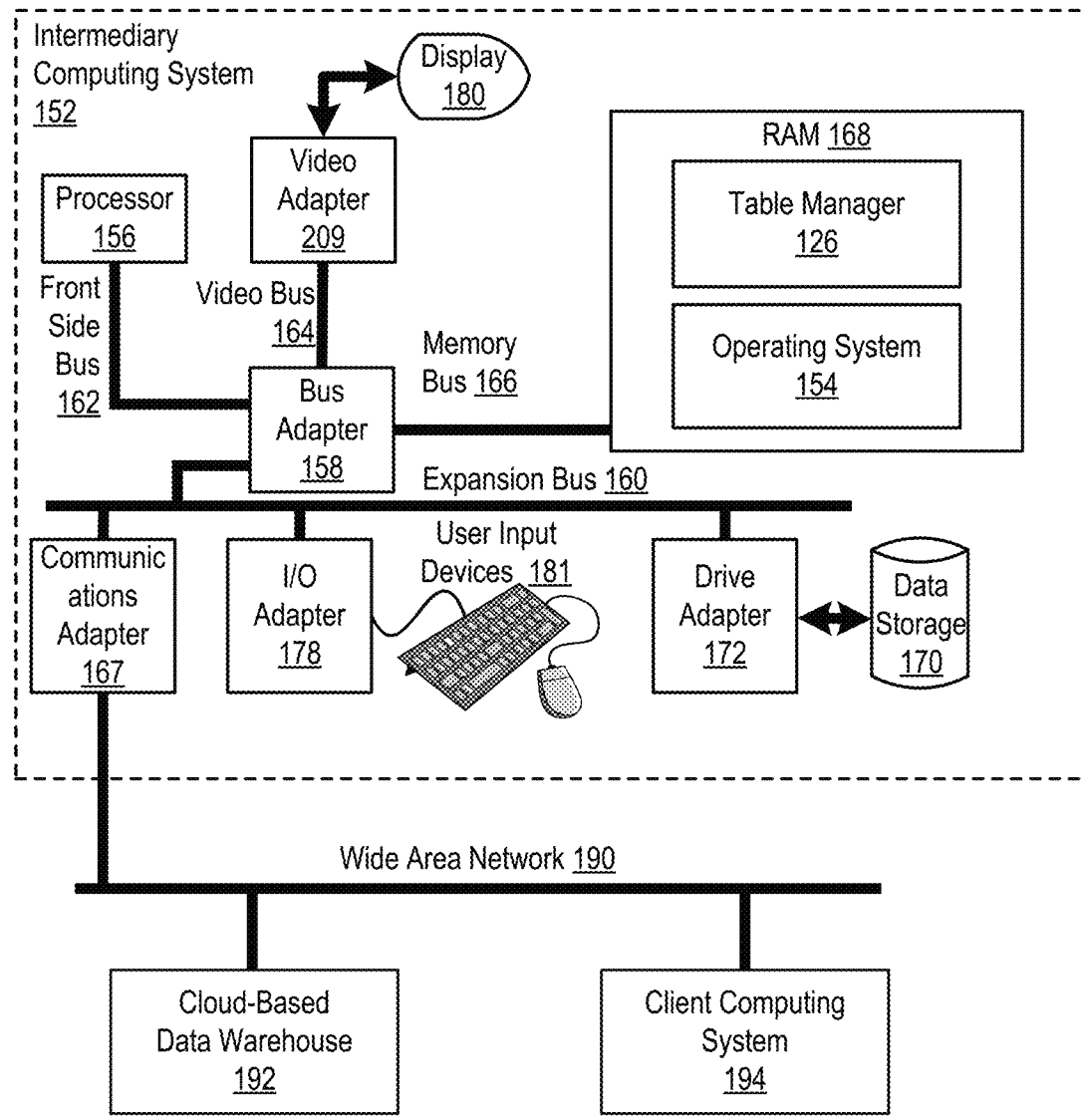
FIG. 1 sets forth a block diagram of an example system configured for assigning sequence numbers in editable tables according to embodiments of the present invention.

Exemplary methods, apparatus, and products for assigning sequence numbers in editable tables in accordance with the present invention are described with reference to the accompanying drawings, beginning with FIG. 1. FIG. 1 sets forth a block diagram of automated computing machinery comprising an exemplary intermediary computing system 152 configured for assigning sequence numbers in editable tables according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for assigning sequence numbers in editable tables according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for assigning sequence numbers in editable tables according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for assigning sequence numbers in editable tables according to embodiments of the present invention include Integrated Drive Electronics (IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for assigning sequence numbers in editable tables according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
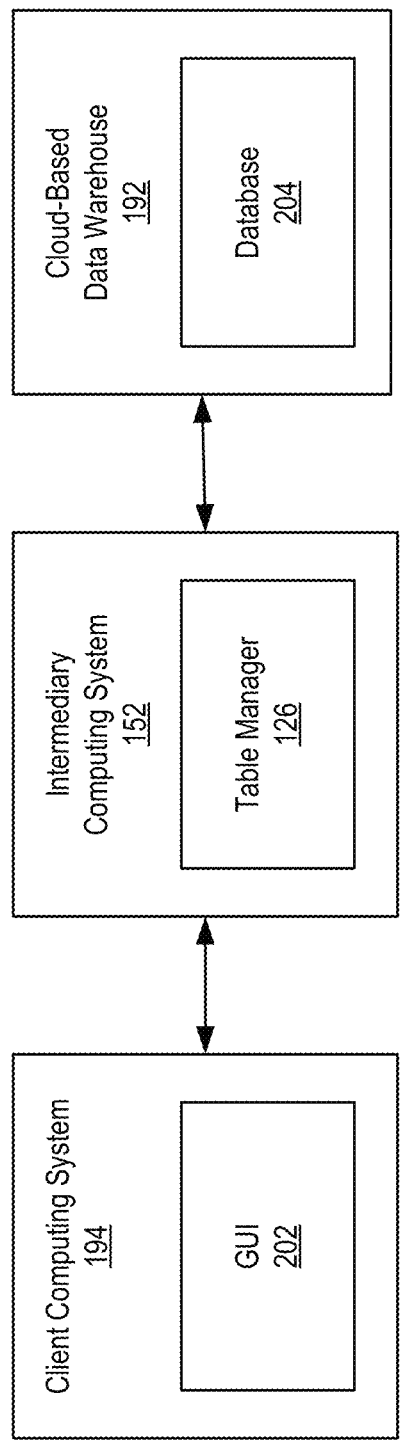
FIG. 2 sets forth a block diagram of an example system configured for assigning sequence numbers in editable tables according to embodiments of the present invention.

FIG. 2 shows an exemplary system for assigning sequence numbers in editable tables according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126. The cloud-based data warehouse 192 includes a database 204. The client computing system 194 may access the cloud-based data warehouse 192 and database 204 via the table manager 126 on the intermediary computing system 152.

The GUI 202 is a visual presentation configured to present data sets in the form of worksheets, workbooks, and graphical elements to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to generate database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to create a new row and values for that new row. The state specification may be a standard file format used to exchange data in asynchronous browser-server communication. For example, the state specification may be a JavaScript Object Notation specification. The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The table manager 126 uses the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database statement.

The table manager 126 may use the database statement to fetch query results (i.e., a data set) from the database 204. The table manager 126 may then present the query results to a user via the GUI 202. The table manager 126 may further manage tables on the database 202 to which a user has made edits, such as adding new rows. Further, the table manager 126 may add columns to new rows and create new tables on the database 202.

Figure 3:
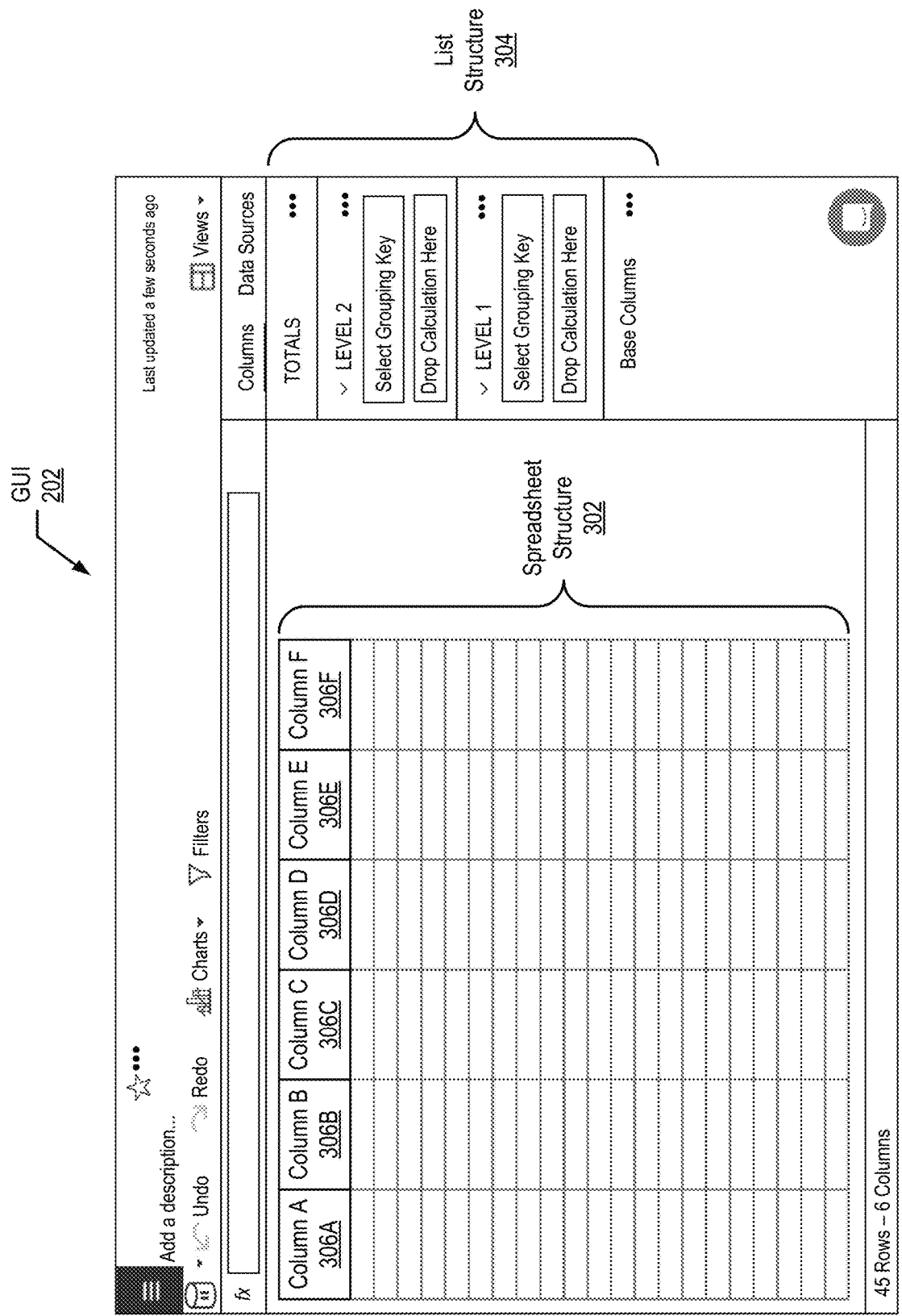
FIG. 3 sets forth a block diagram of an example system configured for assigning sequence numbers in editable tables according to embodiments of the present invention.

FIG. 3 shows an exemplary system for assigning sequence numbers in editable tables according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F). The combination of a worksheet and dynamic graphic elements may be referred to as a workbook.

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
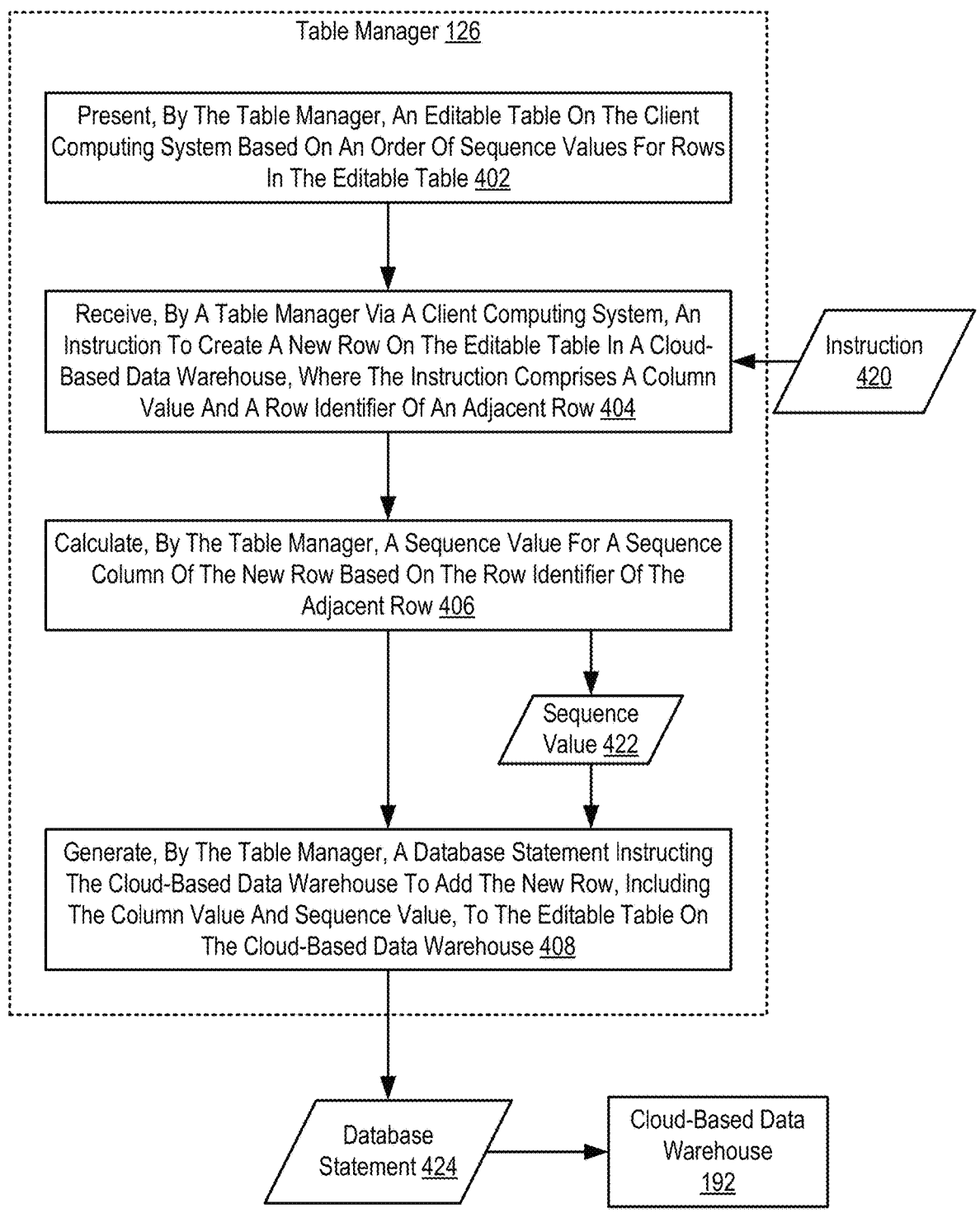
FIG. 4 sets forth a flow chart illustrating an exemplary method for assigning sequence numbers in editable tables according to embodiments of the present invention.

For further explanation, FIG. 4 sets forth a flow chart illustrating an exemplary method for assigning sequence numbers in editable tables according to embodiments of the present invention that includes presenting 402, by the table manager 126, an editable table on the client computing system based on an order of sequence values for rows in the editable table. Presenting 402 the editable table on the client computing system based on an order of sequence values for rows in the editable table may be carried out by organizing query results to arrange the rows of the data set to display in the order indicated by the sequence values in the sequence column of the editable table. The editable table on the cloud-base data warehouse 192 may include a sequence column added by the table manager. Alternatively, the editable table on the cloud-based data warehouse 192 may be joined with a companion table that includes the sequence column.

The editable table may be any table on the cloud-base data warehouse that the user and/or the table manager has authorization to edit. The editable table may also be a table that the user and/or the table manager does not have authorization to edit or does not desire to edit, but may be added to using a companion table. The editable table may include any number of columns and rows. When presented on the GUI on the client computing system, the sequence values of the sequence column may determine the order of rows in the table. Without using the sequence values, the editable table may be presented in an order based on one or more other column values (or in no particular order if no order is specified). Basing the order on existing column values is generally acceptable for read-only tables. However, when a user inserts a new row into an editable table, there is an expectation that the new row will exist in the table location selected by the user. Further, a user may want to create an order of rows in the table based on factors that are not elucidated in the editable table. For example, a user may want to organize a table of their personal contacts in order of each contacts' importance to that user. Consequently, the editable table may be presented using a sequence value for ordering the rows.

The sequence value is a value that places a particular row between two other rows in the editable table. The sequence values for the editable table are stored in a sequence column. The sequence column may be added to the editable row if the editable row does not include a sequence column. The sequence column may be added to the editable row by joining, merging, unioning, or otherwise combining the editable table to a companion table that includes the sequence column. When presented in the GUI, the sequence values and the sequence column in the editable table may be hidden from the user. Table 1 shows an example of an editable table containing elements of a user's home theater setup. Table 2 shows the same editable table as presented in the GUI.

TABLE 1

| Sequence Column | Column A - Type | Column B - Maker | Column C- Model |
|---|---|---|---|
| 0.5 | Television | LG | 55" Class C1 Series |
| 0.625 | Receiver | Denon | AVR-S960H |
| 0.75 | Front Speakers | HTD | Level THREE |

TABLE 2

| Column A - Type | Column B - Maker | Column C- Model |
|---|---|---|
| Television | LG | 55" Class C1 Series |
| Receiver | Denon | AVR-S960H |
| Front Speakers | HTD | Level THREE |

The method of FIG. 4 also includes receiving 404, by a table manager 126 via a client computing system, an instruction 420 to create a new row on the editable table in a cloud-based data warehouse 192, wherein the instruction comprises a column value and a row identifier of an adjacent row. Receiving 404 the instruction 420 to create the new row on the editable table in the cloud-based data warehouse 192 may be carried out by detecting that a user has manipulated elements of the GUI and/or submitted data using the GUI such that the generation of the instruction 420 is triggered, and the instruction 420 is sent to the table manager 126. A row identifier may be any value that uniquely identifies the row, including any unique column value. For example, a row identifier may be the sequence column value.

The instruction 420 may be received in the form of a state specification from the GUI. Specifically, each change to the GUI may result in a new or updated state specification 420 that operates as an instruction to the table manager 126. The initial presentation of the editable table may be in response to a table request made through the GUI. For example, a user may select the editable table from a group of tables presented for display on the GUI. The instruction 420 to add a row may be received without presenting 402 the editable table.

The instruction 420 to create a new row may include column values for at least one column in the row. A column value is a value for a particular column. For example, "LG", "Denon", and "HTD" are values for column B in Table 1. The instruction 420 also includes an indication of the location in the editable table for the new row. The location may be received as an identifier of one or more adjacent rows. Using the example of Table 1, the instruction to create the "Receiver" row may have included the column values "Receiver", "Denon", and "AVR-S960H" along with a row identifier of "Television" as the above adjacent row.

The method of FIG. 4 also includes calculating 406, by the table manager 126, a sequence value 422 for a sequence column of the new row based on the row identifier of the adjacent row. The sequence values may be organized and calculated in a variety of ways. Calculating 406 the sequence value 422 for the sequence column of the new row based on the row identifier may be carried out by generating a sequence value between the above adjacent row and the below adjacent row of the new row. The above adjacent row and the below adjacent row of the new row may be determined using whichever adjacent row identifier is received in the instruction 420. If the above adjacent row identifier is received in the instruction 420, then the below adjacent row may be determined using the current location of the above adjacent row. Conversely, if the below adjacent row identifier is received in the instruction 420, then the above adjacent row may be determined using the current location of the below adjacent row. Calculating 406 the sequence value 422 for the sequence column of the new row may also include retrieving the smallest known sequence number to insert the row at the start of the editable table or the largest known sequence number to insert the row at the end of the editable table.

The sequence values may be any group of values that indicates an order for the rows. The sequence values may be calculated as values between two numbers, such as consecutive or non-consecutive integers. For example, each sequence value in the sequence column may be between 0 and 1 with each sequence value being a decimal fraction. For example, in Table 3, each sequence value in the sequence row is between 0 and 1. As shown in Table 3, a new row for "Center Speaker" has been added. The sequence value for the new row has been calculated as exactly halfway between the above adjacent row "Receiver" and the below adjacent row "Front Speakers". Note that Table 3 depicts the desired result after the new row has been added to the table. Using this process, it is possible to calculate a new sequence value between any two existing sequence values.

Additional columns may be used to resolve sequence value ties. For example, a global edit column with unique global edit values for each row may be used to resolve any sequence value ties that may occur.

TABLE 3

| Sequence Column | Column A - Type | Column B - Maker | Column C - Model |
|---|---|---|---|
| 0.5 | Television | LG | 55" Class C1 Series |
| 0.625 | Receiver | Denon | AVR-S960H |
| 0.6875 | Center Speaker | Elac | C52 |
| 0.75 | Front Speakers | HTD | Level THREE |

The method of FIG. 4 also includes generating 408, by the table manager 126, a database statement 424 instructing the cloud-based data warehouse 192 to add the new row, including the column value and sequence value 422, to the editable table on the cloud-based data warehouse 192. Generating 408 the database statement 424 instructing the cloud-based data warehouse 192 to add the new row may be carried out by converting the column value and sequence value into a database statement targeting the database on the cloud-based data warehouse 192. Specifically, the column value and sequence value may be used to populate a database statement that creates the new row on the editable table.

Generating 408 the database statement 424 instructing the cloud-based data warehouse 192 to add the new row may also be carried out by generating an intermediate representation from which the updated editable table may be presented to a user while the changes to the editable table on the database in the cloud-based data warehouse are pending. The table manager 126 may intercept subsequent requests for the editable table and include the new row in the query results for the editable table by incorporating the edits from the intermediate representation.

Generating 408 the database statement 424 may also include various other intermediate forms, including an abstract syntax tree, a canonicalized hierarchy, a worksheet algebra, and a relational algebra. During each of these intermediate forms, the table manager 126 may optimize the database statement to efficiently retrieve the initial results from the database. For example, if the client requests to "add a row, then update column A of that row to value X, then update column B of that row to value Y", the Table Manager might emit a single statement "add a new row with A=X and B=Y". The resulting database statement may be a structured query language statement (SQL).

The database statement 424 may create the new row on a companion table within the database on the cloud-based data warehouse 192. The companion table is database table to which edits are made and the sequencing column is added to avoid directly editing the editable table on the cloud-based data warehouse 192. When retrieving the editable table from the cloud-based data warehouse 192, the database statement combines the editable table with the companion table and presents the resulting combination on the GUI. When utilizing a companion table, the user and/or the table manager need not have authorization to edit the editable table. The relationship between the companion table and editable table is based on the primary key values, such that a row from the original table is "version 1" and all rows in the companion are "version 2" or beyond.

The above limitations improve the operation of the computer system by enabling edits to a database table that mirror a user's expectation of editing a table locally on the user's system. This is accomplished by including a sequencing column with sequencing values to maintain the order of rows as presented to the user, allowing the user to arbitrarily order the rows within the editable table.

Figure 5:
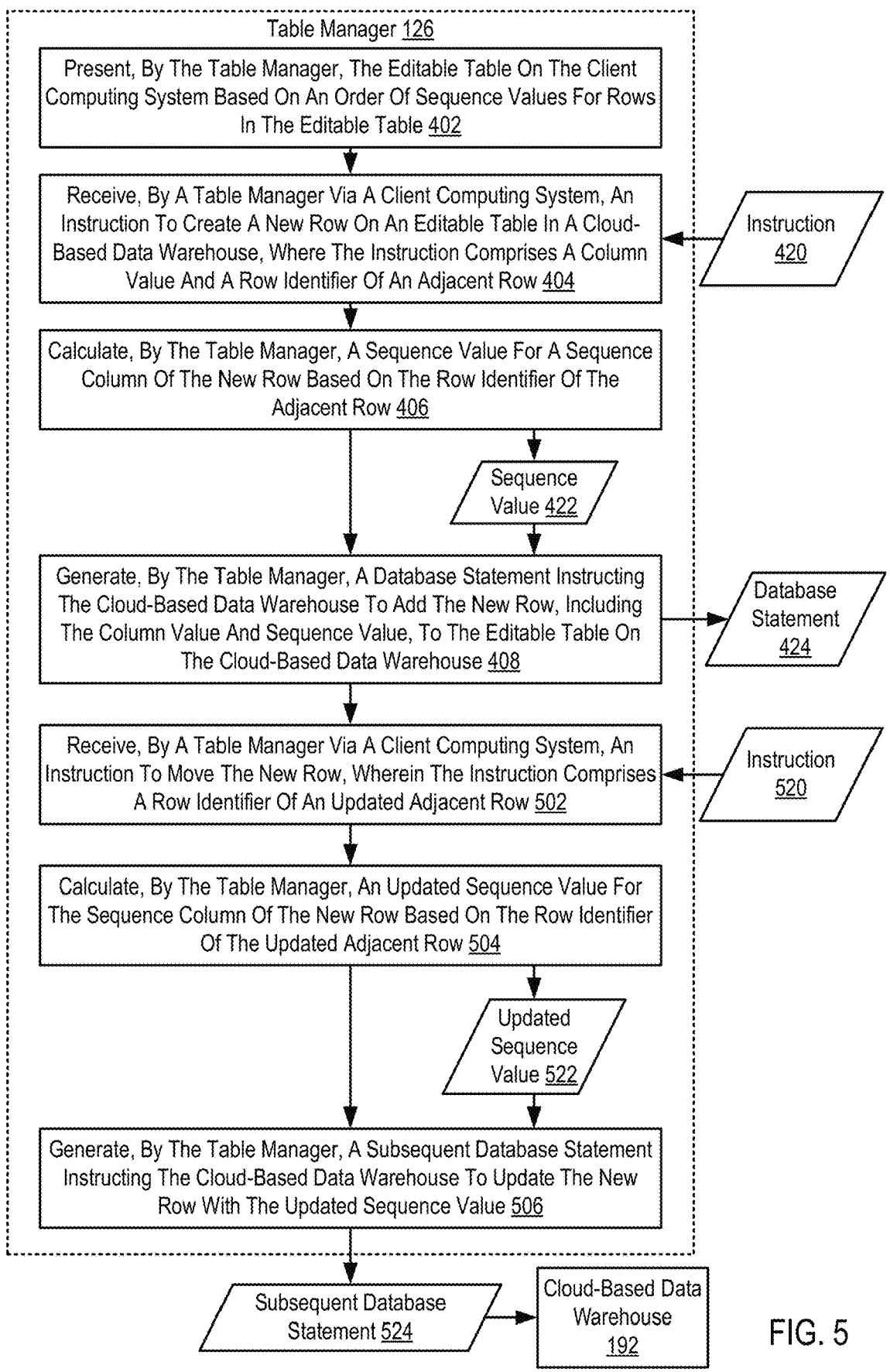
FIG. 5 sets forth a flow chart illustrating an exemplary method for assigning sequence numbers in editable tables according to embodiments of the present invention.

For further explanation, FIG. 5 sets forth a flow chart illustrating a further exemplary method for assigning sequence numbers in editable tables according to embodiments of the present invention that includes presenting 402, by the table manager 126, an editable table on the client computing system based on an order of sequence values for rows in the editable table; receiving 404, by a table manager 126 via a client computing system, an instruction 420 to create a new row on the editable table in a cloud-based data warehouse 192, wherein the instruction comprises a column value and a row identifier of an adjacent row; calculating 406, by the table manager 126, a sequence value 422 for a sequence column of the new row based on the row identifier of the adjacent row; and generating 408, by the table manager 126, a database statement 424 instructing the cloud-based data warehouse 192 to add the new row, including the column value and sequence value 422, to the editable table on the cloud-based data warehouse 192.

The method of FIG. 5 differs from the method of FIG. 4, however, in that FIG. 5 further includes receiving 502, by a table manager 126 via a client computing system, an instruction 520 to move the new row, wherein the instruction 520 comprises a row identifier of an updated adjacent row. Receiving 502 the instruction 520 to move the new row may be carried out by detecting that a user has manipulated elements of the GUI and/or submitted data using the GUI such that the generation of the instruction 520 is triggered, and the instruction 520 is sent to the table manager 126. The instruction 520 may be received in the form of a state specification from the GUI. The instruction 520 may include a row identifier of the new row being moved. The instruction 520 may also include a row identifier of the updated adjacent row as a target location for the new row. The updated adjacent row may be the target above adjacent or below adjacent row (as indicated or expected).

The method of FIG. 5 also includes calculating 504, by the table manager 126, an updated sequence value 522 for the sequence column of the new row based on the row identifier of the updated adjacent row. Calculating 504 the updated sequence value 522 for the sequence column of the new row may be carried out by generating a sequence value between the above updated adjacent row and the below updated adjacent row of the moved new row.

The method of FIG. 5 also includes generating 506, by the table manager 126, a subsequent database statement 524 instructing the cloud-based data warehouse 192 to update the new row with the updated sequence value 522. Generating 506, by the table manager 126, the subsequent database statement 524 may be carried out by creating the subsequent database statement 524 that updates the sequence value for the new row to the calculated updated sequence value 522. Generating 506, by the table manager 126, the subsequent database statement 524 may also be carried out by creating a second new row with the same column values as the first new row. The second new row will have the updated sequence value. The first new row may then be deleted or hidden from display on the GUI (e.g., using versioning of the editable table).

Table 4 shows an example table, relative to Table 3, in which the "Front Speakers" row has been moved from below the "Center Speaker" row to above the "Center Speaker" row. As shown in Table 4, the sequence value for the "Front Speakers" row has been recalculated to be between the sequence value for the "Receiver" row and the sequence value for the "Center Speaker" row.

TABLE 4

| Sequence Column | Column A - Type | Column B - Maker | Column C - Model |
| --- | --- | --- | --- |
| 0.5 | Television | LG | 55" Class C1 Series |
| 0.625 | Receiver | Denon | AVR-S960H |
| 0.65625 | Front Speakers | HTD | Level THREE |
| 0.6875 | Center Speaker | Elac | C52 |

Note that the method described in steps 502, 504, and 506 described in reference to FIG. 5 may be performed independently from the steps described in reference to FIG. 4.

Figure 6:
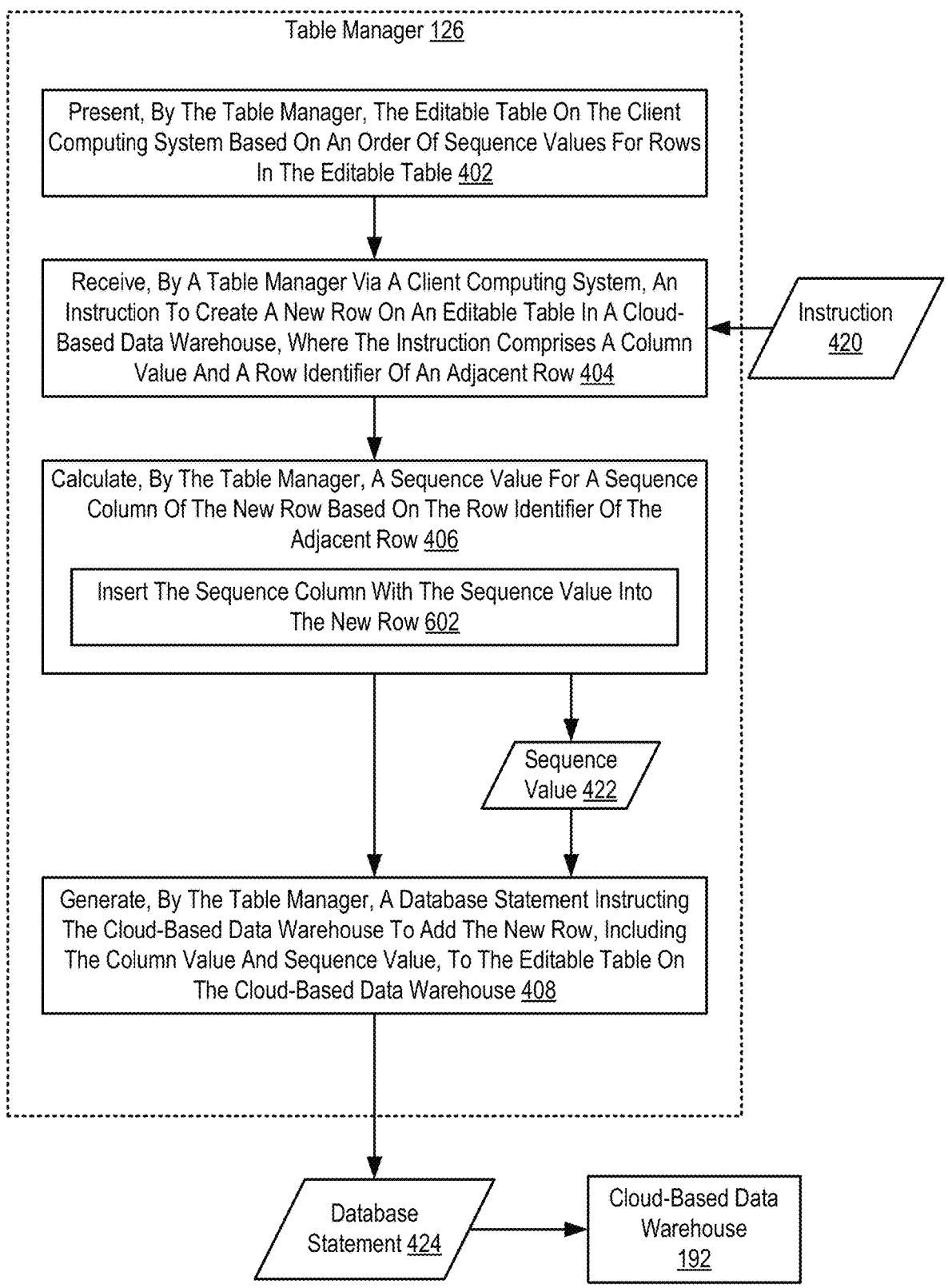
FIG. 6 sets forth a flow chart illustrating an exemplary method for assigning sequence numbers in editable tables according to embodiments of the present invention.

For further explanation, FIG. 6 sets forth a flow chart illustrating a further exemplary method for assigning sequence numbers in editable tables according to embodiments of the present invention that includes presenting 402, by the table manager 126, an editable table on the client computing system based on an order of sequence values for rows in the editable table; receiving 404, by a table manager 126 via a client computing system, an instruction 420 to create a new row on the editable table in a cloud-based data warehouse 192, wherein the instruction comprises a column value and a row identifier of an adjacent row; calculating 406, by the table manager 126, a sequence value 422 for a sequence column of the new row based on the row identifier of the adjacent row; and generating 408, by the table manager 126, a database statement 424 instructing the cloud-based data warehouse 192 to add the new row, including the column value and sequence value 422, to the editable table on the cloud-based data warehouse 192.

The method of FIG. 6 differs from the method of FIG. 4, however, in that calculating 406, by the table manager 126, a sequence value 422 for a sequence column of the new row based on the row identifier of the adjacent row includes inserting 602 the sequence column with the sequence value 422 into the new row. Inserting 602 the sequence column with the sequence value 422 into the new row may be carried out by appending the sequence column and sequence value to the new row via the database statement. Specifically, the table manager 126 receives only a location for the new row and one or more column values. The table manager 126 inserts the sequence value into the new row. The table manager 126 creates and maintains the sequence column and sequence values invisibly to the user and without the involvement of the user. The sequence values are revealed to the user in the order that the rows are presented in the GUI.

Figure 7:
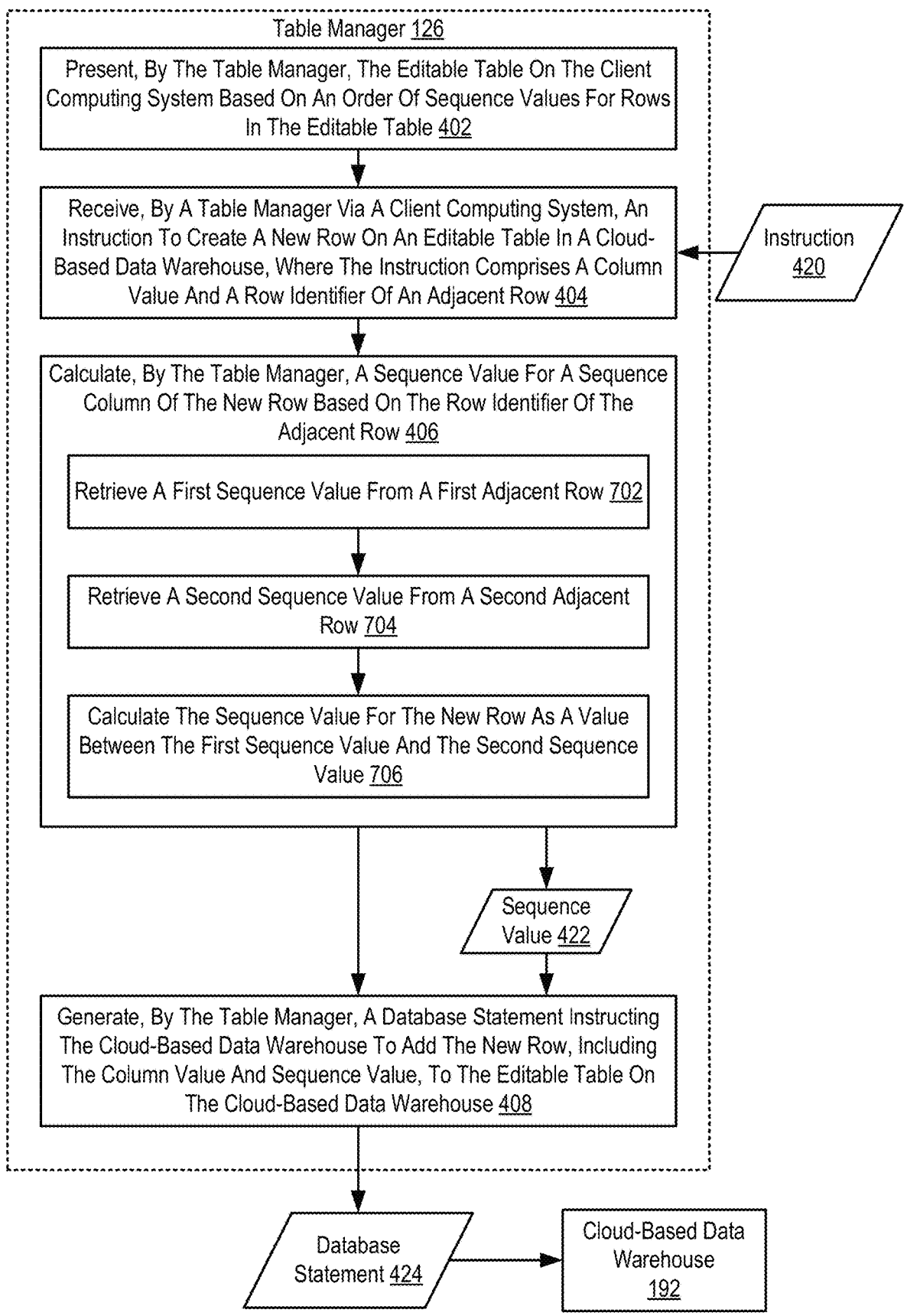
FIG. 7 sets forth a flow chart illustrating an exemplary method for assigning sequence numbers in editable tables according to embodiments of the present invention.

For further explanation, FIG. 7 sets forth a flow chart illustrating a further exemplary method for assigning sequence numbers in editable tables according to embodiments of the present invention that includes presenting 402, by the table manager 126, an editable table on the client computing system based on an order of sequence values for rows in the editable table; receiving 404, by a table manager 126 via a client computing system, an instruction 420 to create a new row on the editable table in a cloud-based data warehouse 192, wherein the instruction comprises a column value and a row identifier of an adjacent row; calculating 406, by the table manager 126, a sequence value 422 for a sequence column of the new row based on the row identifier of the adjacent row; and generating 408, by the table manager 126, a database statement 424 instructing the cloud-based data warehouse 192 to add the new row, including the column value and sequence value 422, to the editable table on the cloud-based data warehouse 192.

The method of FIG. 7 differs from the method of FIG. 4, however, in that calculating 406, by the table manager 126, a sequence value 422 for a sequence column of the new row based on the row identifier of the adjacent row includes retrieving 702 a first sequence value from a first adjacent row; retrieving 704 a second sequence value from a second adjacent row; and calculating 706 the sequence value 422 for the new row as a value between the first sequence value and the second sequence value.

Retrieving 702 a first sequence value from a first adjacent row may be carried out by evaluating the version of the editable table previously retrieved by the table manager 126 and extracting the first sequence value from the row immediately above (or below) the indicated location of the new row. Alternatively, the table manager 126 may generate and send a database statement to retrieve the first sequence value from the editable table on the cloud-based data warehouse.

Retrieving 704 a second sequence value from a second adjacent row may be carried out by evaluating the version of the editable table previously retrieved by the table manager 126 and extracting the second sequence value from the row immediately below (or above) the indicated location of the new row. Alternatively, the table manager 126 may generate and send a database statement to retrieve the second sequence value from the editable table on the cloud-based data warehouse.

Calculating 706 the sequence value 422 for the new row as a value between the first sequence value and the second sequence value may be carried out by generating a sequence value that places the new column directly adjacent to the first adjacent row and the second adjacent row. Calculating 706 the sequence value 422 for the new row may include generating a sequence value between the first sequence value and the second sequence value. Such a value may be derived, for example, by adding the first sequence value and the second sequence value and dividing by two. The particular formula may vary according to the values used for the sequencing column.

Figure 8:
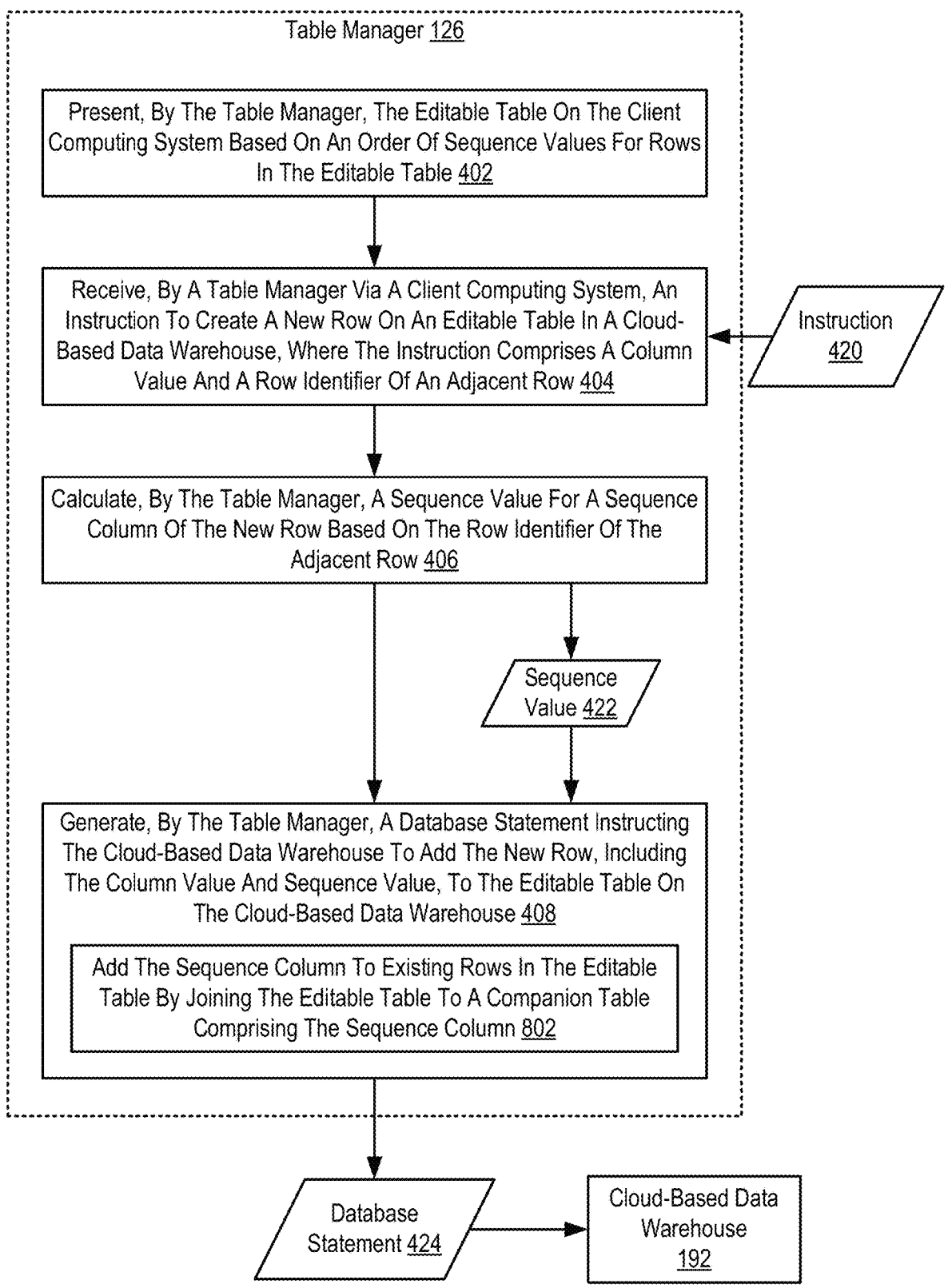
FIG. 8 sets forth a flow chart illustrating an exemplary method for assigning sequence numbers in editable tables according to embodiments of the present invention.

For further explanation, FIG. 8 sets forth a flow chart illustrating a further exemplary method for assigning sequence numbers in editable tables according to embodiments of the present invention that includes presenting 402, by the table manager 126, an editable table on the client computing system based on an order of sequence values for rows in the editable table; receiving 404, by a table manager 126 via a client computing system, an instruction 420 to create a new row on the editable table in a cloud-based data warehouse 192, wherein the instruction comprises a column value and a row identifier of an adjacent row; calculating 406, by the table manager 126, a sequence value 422 for a sequence column of the new row based on the row identifier of the adjacent row; and generating 408, by the table manager 126, a database statement 424 instructing the cloud-based data warehouse 192 to add the new row, including the column value and sequence value 422, to the editable table on the cloud-based data warehouse 192.

The method of FIG. 8 differs from the method of FIG. 4, however, in that generating 408, by the table manager 126, a database statement 424 instructing the cloud-based data warehouse 192 to add the new row, including the column value and sequence value 422, to the editable table on the cloud-based data warehouse 192 includes adding 802 the sequence column to existing rows in the editable table by joining the editable table to a companion table comprising the sequence column. Adding 802 the sequence column to existing rows in the editable table by joining the editable table to a companion table may be carried out by creating the companion table with the sequence column on the database on the cloud-based data warehouse. The table manager 126 then generates the database statement to merge, join, union, or otherwise combine the editable table with the companion table.

The editable table may be a table created by a user via the table manger. Such an editable table may be initially created with the sequence column. However, the sequence column may not be presented to or visible by a user of the table manager. Rather, in creating the editable table, the user may input a number of different columns for the table and the table manager adds the sequence column to the columns received from the user.

Alternatively, the editable table may be an existing table on the database that a user desires to edit. In order to maintain the integrity of the original editable table or to allow the original editable table to be updated by another entity, the table manager may merge, join, union, or otherwise combine the editable table with a companion table that includes the sequence column. Rows added by the user may then be added to the companion table. When a user requests the current version of the editable table, the original editable table is joined to the companion table and presented to the user.

In view of the explanations set forth above, readers will recognize that the benefits of assigning sequence numbers in editable tables according to embodiments of the present invention include:

Improving the operation of a computing system by enabling edits to a database table that mirror a user's expectation of editing a table locally on the user's system, increasing system usability.

Improving the operation of a computing system by including a sequencing column with sequencing values to maintain the order of rows as presented to the user, allowing the user to arbitrarily order the rows within the editable table, increasing system usability.

Exemplary embodiments of the present invention are described largely in the context of a fully functional computer system for assigning sequence numbers in editable tables. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for assigning sequence numbers in editable tables, the method comprising:
    receiving, by a table manager via a manipulation of a graphical user interface GUI) by a user of a client computing system, an instruction to create a new row on an editable table in a cloud-based data warehouse, wherein the cloud-based data warehouse does not natively support row ordering and wherein the instruction comprises a row identifier of an adjacent row;

calculating, by the table manager, a sequence value for a sequence column of the new row based on the row identifier of the adjacent row; and updating, by the table manager, the editable table on the cloud-based data warehouse, including generating and transmitting, to the cloud-based data warehouse, a database query instructing the cloud-based data warehouse to add the new row to the editable table on the cloud-based data warehouse, wherein the database query comprises the column value and the sequence value, addition of the new row maintains ordering of other rows of the editable table, and the column value is stored in a column of the new row.

2. The method of claim 1, further comprising: presenting, by the table manager, the editable table on the client computing system based on an order of sequence values for rows in the editable table.

3. The method of claim 2, wherein presenting, by the table manager, the editable table on the client computing system based on the order of sequence values for rows in the editable table comprises hiding the sequence values from presentation on the client computing system.

4. The method of claim 1, further comprising:
receiving, by the table manager via the client computing system, an instruction to move the new row, wherein the instruction comprises a row identifier of an updated adjacent row;

calculating, by the table manager, an updated sequence value for the sequence column of the new row based on the row identifier of the updated adjacent row; and generating, by the table manager, a subsequent database query instructing the cloud-based data warehouse to update the new row with the updated sequence value.

5. The method of claim 1, wherein calculating, by the table manager, the sequence value for the sequence column of the new row based on the row identifier of the adjacent row comprises inserting the sequence column with the sequence value into the new row.

6. The method of claim 1, wherein calculating, by the table manager, the sequence value for the sequence column of the new row based on the row identifier of the adjacent row comprises:
retrieving a first sequence value from a first adjacent row;
retrieving a second sequence value from a second adjacent row; and
calculating the sequence value for the new row as a value between the first sequence value and the second sequence value.

7. The method of claim 1, wherein generating the database query comprises adding the sequence column to existing rows in the editable table by joining the editable table to a companion table comprising the sequence column.

8. The method of claim 1, wherein the row identifier in the instruction is generated based on a location in the editable table selected by a user of the client computing system.

9. The method of claim 1, wherein at least a portion of the sequence values in the sequence column are values between two consecutive integers.

10. The method of claim 1, wherein the database query is a structured query language query.

11. An apparatus for assigning sequence numbers in editable tables, the apparatus comprising a computer processor, a computer memory operatively coupled to the computer processor, the computer memory having disposed within it computer program instructions that, when executed by the computer processor, cause the apparatus to carry out the steps of:
receiving, by a table manager via a manipulation of a graphical user interface (GUI) by a user of a client computing system, an instruction to create a new row on an editable table in a cloud-based data warehouse, wherein the cloud-based data warehouse does not natively support row ordering and wherein the instruction comprises a row identifier of an adjacent row;

calculating a sequence value for a sequence column of the new row based on the row identifier of the adjacent row; and updating, by the table manager, the editable table on the cloud-based data warehouse, including generating and transmitting, to the cloud-based data warehouse, a database query instructing the cloud-based data warehouse to add the new row to the editable table on the cloud-based data warehouse, wherein the database query comprises the column value and the sequence value, addition of the new row maintains ordering of other rows of the editable table, and the column value is stored in a column of the new row.

12. The apparatus of claim 11, wherein the computer program instructions further cause the apparatus to carry out the step of: presenting the editable table on the client computing system based on an order of sequence values for rows in the editable table.

13. The apparatus of claim 12, wherein presenting the editable table on the client computing system based on the order of sequence values for rows in the editable table comprises hiding the sequence values from presentation on the client computing system.

14. The apparatus of claim 11, wherein the computer program instructions further cause the apparatus to carry out the steps of:
receiving, by the table manager via the client computing system, an instruction to move the new row, wherein the instruction comprises a row identifier of an updated adjacent row;

calculating, by the table manager, an updated sequence value for the sequence column of the new row based on the row identifier of the updated adjacent row; and generating, by the table manager, a subsequent database query instructing the cloud-based data warehouse to update the new row with the updated sequence value.

15. The apparatus of claim 11, wherein calculating the sequence value for the sequence column of the new row based on the row identifier of the adjacent row comprises inserting the sequence column with the sequence value into the new row.

16. The apparatus of claim 11, wherein calculating the sequence value for the sequence column of the new row based on the row identifier of the adjacent row comprises:
retrieving a first sequence value from a first adjacent row;
retrieving a second sequence value from a second adjacent row; and
calculating the sequence value for the new row as a value between the first sequence value and the second sequence value.

17. The apparatus of claim 11, wherein generating the database query comprises adding the sequence column to existing rows in the editable table by joining the editable table to a companion table comprising the sequence column.

18. The apparatus of claim 11, wherein the row identifier in the instruction is generated based on a location in the editable table selected by a user of the client computing system.

19. The apparatus of claim 11, wherein at least a portion of the sequence values in the sequence column are values between two consecutive integers, and wherein the row identifier of the adjacent row included in the instruction is a value of a column other than the sequence column.

20. A computer program product for assigning sequence numbers in editable tables, the computer program product comprising a non-transitory computer readable medium storing computer program instructions that, when executed, cause a computer to carry out the steps of:

receiving, by a table manager via a manipulation of a graphical user interface (GUI) by a user of a client computing system, an instruction to create a new row on an editable table in a cloud-based data warehouse, wherein the cloud-based data warehouse does not natively support row ordering and wherein the instruction comprises a row identifier of an adjacent row;

calculating, by the table manager, a sequence value for a sequence column of the new row based on the row identifier of the adjacent row; and updating, by the table manager, the editable table on the cloud-based data warehouse, including generating and transmitting, to the cloud-based data warehouse, a database query instructing the cloud-based data warehouse to add the new row to the editable table on the cloud-based data warehouse, wherein the database query comprises the column value and the sequence value, addition of the new row maintains ordering of other rows of the editable table, and the column value is stored in a column of the new row.

* * * * *